Figure 1:
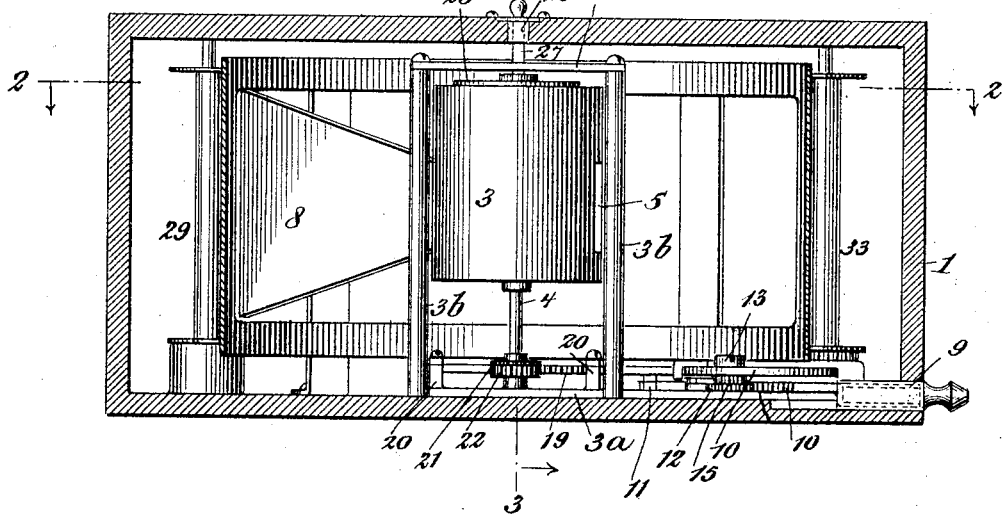

No. 638,582. Patented Dec. 5, 1899.
E. HOPKINSON.
METHOD OF AND APPARATUS FOR MAKING PANORAMIC PHOTOGRAPHS.
(Application filed Mar. 23, 1899.)
(No Model.) 3 Sheets—Sheet 1.

WITNESSES:
O. H. Nayford
Harry Mark

INVENTOR
Ernest Hopkinson

No. 638,582. Patented Dec. 5, 1899.
E. HOPKINSON.
METHOD OF AND APPARATUS FOR MAKING PANORAMIC PHOTOGRAPHS.
(Application filed Mar. 23, 1899.)
(No Model.) 3 Sheets—Sheet 2.

WITNESSES: INVENTOR

No. 638,582. Patented Dec. 5, 1899.
E. HOPKINSON.
METHOD OF AND APPARATUS FOR MAKING PANORAMIC PHOTOGRAPHS.
(Application filed Mar. 23, 1899.)
(No Model.) 3 Sheets—Sheet 3.

WITNESSES: INVENTOR

UNITED STATES PATENT OFFICE.

ERNEST HOPKINSON, OF EAST ORANGE, NEW JERSEY.

METHOD OF AND APPARATUS FOR MAKING PANORAMIC PHOTOGRAPHS.

SPECIFICATION forming part of Letters Patent No. 638,582, dated December 5, 1899.

Application filed March 23, 1899. Serial No. 710,140. (No model.)

*To all whom it may concern:*

Be it known that I, ERNEST HOPKINSON, a citizen of the United States, residing at Brick Church, East Orange, in the county of Essex and State of New Jersey, have invented a new and useful Improvement in Methods of and Apparatus for Photographing, of which the following is a specification.

The present invention relates to a new and improved method of taking photographs and in the apparatus therefor.

Especially the invention relates to a new method of taking panoramic views and in a camera designed to carry out such method.

Heretofore in panoramic cameras difficulty has been experienced in obtaining the proper exposure of the sensitive surface under varying conditions of light, and it has been practically impossible to use a panoramic camera for interior work or where the subject was but poorly illuminated.

By my improvement any desired amount of exposure may be given to a subject and all the advantages of a panoramic camera will be obtained. I accomplish this by superimposing upon a sensitive film any number of exposures of the same subject, each exposure being sectional and continuously progressive, the images thrown by the several exposures exactly registering with each other. In this manner any desired amount of exposure may be given to the sensitive surface. In my invention the lens is mounted on its optical center and has the usual light-directing chamber, which confines and directs the light upon a section of the sensitive film, which is supported upon a frame in the arc of a circle whose radius corresponds to the back focus of the lens. To effect the result of superimposing a number of exposures upon each other, so as to produce a sharp and clearly-defined picture of the proper strength, means must be provided whereby the lens is oscillated automatically and without any manual operation, and the reversing of the direction of movement of the lens and light-directing chamber must be done smoothly and without any jar. This is the method of photographing and the manner of operation of my invention.

In the drawings I have illustrated a construction embodying my invention and one in which the process of photographing is carried out; but it will be understood that I do not limit myself to such form, as I consider myself entitled to cover all forms of panoramic cameras wherein means are provided for automatically oscillating a lens and its light-directing chamber in opposite directions, so as to superimpose any number of exposures upon each other.

Figure 2:
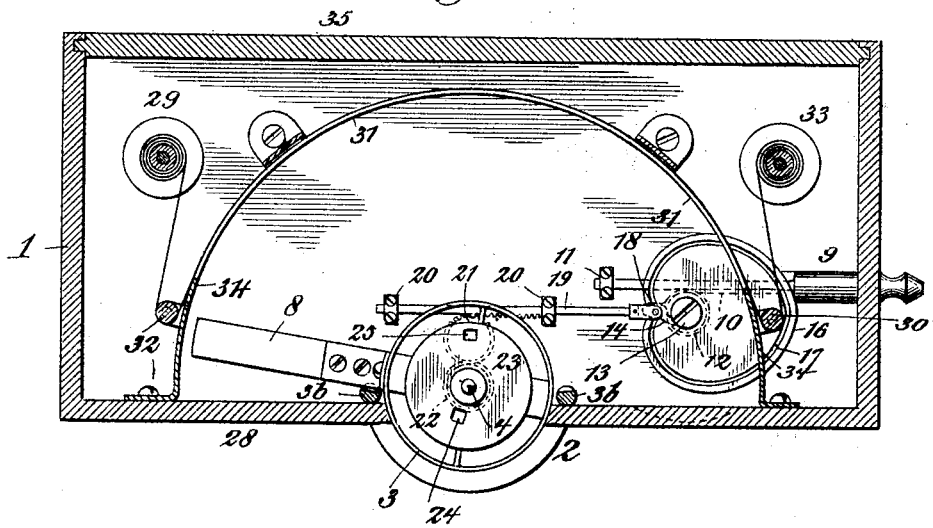
Figure 3:
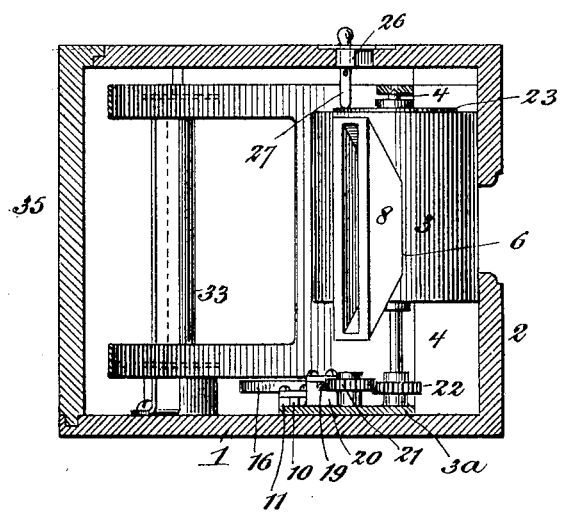
Figure 4:
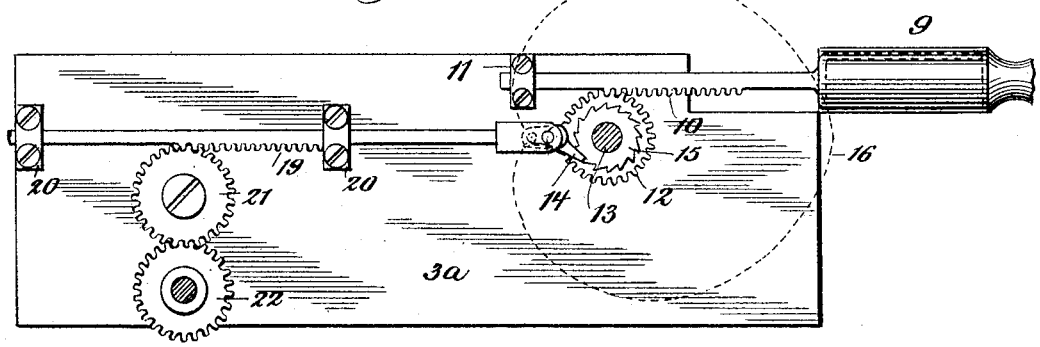
Figure 5:
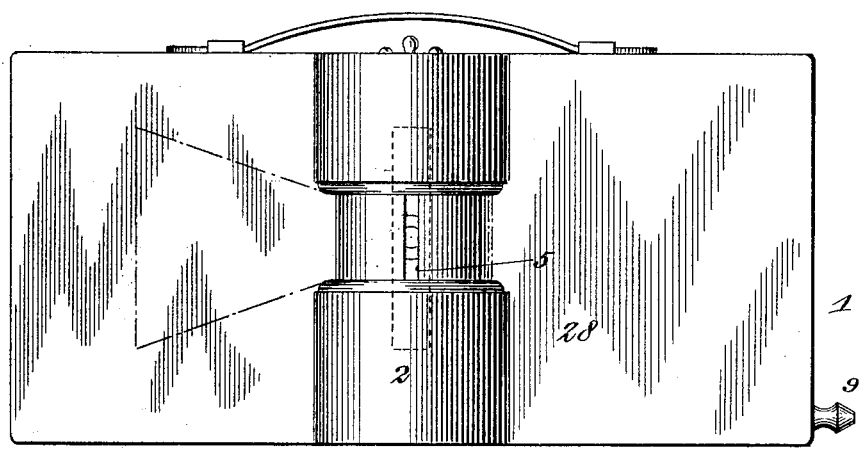
Figure 6:
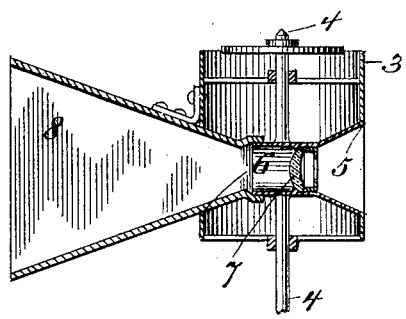
Figure 7:

In the drawings, Figure 1 is a front elevational view, partly in section and showing the front of the camera removed. Fig. 2 is a view in section taken along line 2 2 of Fig. 1. Fig. 3 is a view, partly in side elevation and partly in section, along line 3 3 of Fig. 1. Fig. 4 is a view in plan, on an enlarged scale, of the lens-operating mechanism. Fig. 5 is a front elevational view. Fig. 6 is a central vertical section through the lens-mounting and light-directing chamber. Fig. 7 is a view of the locking-disk, the same being in section along a broken line passing through the two recesses.

Like symbols of reference refer to like parts throughout the several views of the drawings.

Referring to the drawings in detail, 1 designates the camera-box, which is provided with a "bay-window" 2, corresponding in size to the diameter of a tube-section or cylinder 3, provided with shafts 4, whereby the same is vertically pivoted, said bay-window having a cut-away portion. The cylinder is provided with an outer lens-opening 5 and an inner lens-opening 6, and in the interior of the cylinder and in line with said openings is placed the lens 7. It will be understood, of course, that this lens is so disposed in the cylinder that its optical center is in line with the axis or center of rotation of the cylinder. The lens 7 is mounted in a tube whose front end communicates or registers with the outer lens-opening in the cylinder, and a light-directing chamber 8 is secured to the tube back of the lens, passing through the rear opening 6 in the cylinder 3. The light-directing chamber is of the usual fan-shape form and has an exposure-slit at its rear end, through which the image is thrown upon the sensitive surface. It will be understood that the cylinder 3 is mounted in the opening in the bay-window in light-tight manner.

As shown in the drawings, the cylinder is mounted in a frame composed of the base-plate $3^a$, the standards $3^b$, and the connecting-rod $3^c$, but any manner of mounting may be availed of.

The means for oscillating the lens and light-directing chamber are as follows: A pneumatic plunger 9 is placed at one end of the camera, having its connecting-nipple protruding therefrom. Secured to the plunger is a rack 10, which works in guide 11 and gears with a pinion 12, loosely mounted on a stud 13, said pinion carrying a pawl 14, which engages with a ratchet 15, secured to a heart-cam 16. The heart-cam is provided with a groove 17, in which works a friction-roller 18, carried on the end of a reciprocating rack 19, which works in guides 20. The rack 19 meshes with a gear-wheel 21, which transmits motion to the lens and light-directing chamber by gearing with a gear-wheel 22, secured to the cylinder-shaft. It will be seen that the reciprocation of the pneumatic plunger causes a rotation of the heart-cam, which effects the reciprocation of the rack 19, which through the gear-wheels 21 and 22 causes the lens to oscillate in opposite directions. The stroke of the plunger and the size of the gear-wheel 12 are such as to cause a one-half revolution of the heart-cam at each stroke, which communicates to the lens and light-directing chamber one complete movement in one direction. When the pressure on the pneumatic bulb is released, the plunger is withdrawn and pinion 12 and the pawl carried thereon returned to first position free of connection with the heart-cam, the pawl then falling into mesh with the ratchet 15 to drive the heart-cam through another half-revolution at the next stroke of the pneumatic plunger. When a time exposure is desired, this process is repeated until the desired exposure has been given.

The devices for locking the lens and light-directing chamber consist of a disk 23, secured near the upper end of the lens-shaft 4. This disk is provided with two recesses 24 and 25 at different distances from the center of the disk and circumferentially spaced apart from each other a trifle less than half a circle. The inner recess 24 has its outer edge beveled, and the outer recess 25 has its inner edge oppositely beveled. Located on the top of the camera is a slide 26, through which projects a pin 27, the end of the pin 27 resting or riding upon the disk 23. The end of the pin is beveled at the front and rear sides, so as to coact with the beveled surfaces of the recesses, but has its sides straight. The purpose of this pin is to lock the lens and light-directing chamber by engaging with one of the recesses to lock the parts at one end of an oscillation and to be disengaged and moved into position to lock the same at the opposite end of an oscillation, and in the case of a time exposure to ride upon the disk free until it is desired to stop the exposure, when it is moved into engaging position.

The front of the camera 28 is properly placed somewhat in front of the center of oscillation of the lens and cylinder, so that as the cylinder oscillates its final movement is that of burying the outer lens-opening behind the front of the camera, which constitutes an obstruction-piece to shut off the light, as shown in dotted lines in Fig. 5.

Any desired means may be provided for supporting the film, the parts shown consisting of a supply-spool 29, a guide-roller 30, a frame 31, a guide-roller 32, and winding-spool 33. As the outer lens-aperture is buried behind the front of the camera, the slit of the light-directing chamber comes in front of the dead-walls 34. The back of the camera, which is designated by the numeral 35, is made removable for the purpose of inserting and taking out spools of sensitive film.

The method of operation is as follows: Assuming the film to be in position upon the frame and the pin 27 seated in the recess 24, locking the lens in position, with the outer lens-opening buried behind the front of the camera, if an instantaneous exposure is desired the pin 27 will be moved along the slide 26 to the limit of its movement, where it will be in the path of oscillation of the recess 25. The plunger 9 is then oscillated by means of the usual bulb, which will cause a half-rotation of the heart-cam 16, which will be communicated to the lens-shaft and cause the same to make one complete movement in one direction. As the recess 25 comes under the pin 27 the pin falls into said recess and locks the lens and light-directing chamber in position. If a time exposure is desired, the pin 27 is placed at the middle point of the slide 26, in which position it is not either in the line of oscillation of recess 24 or 25, the lens and light-directing chamber being then free to move back and forth as many times as the plunger is reciprocated, the pin 27 being moved into locking position when it is desired to terminate the exposure. By these means it will be seen that a panoramic camera is provided in which the sensitive surface is subjected to any number of exposures of the same subject, each exposure being sectional and continuously progressive.

What is claimed as new is—

1. The process of photographing which consists in superimposing upon a sensitive surface two or more exposures of the same subject, each exposure being sectional and continuously progressive, substantially as specified.

2. In a panoramic camera, a lens pivotally mounted on its optical center, a light-directing chamber, and means for automatically oscillating the lens and light-directing chamber in opposite directions, substantially as specified.

3. In a panoramic camera, a lens pivotally mounted on its optical center, a light-directing chamber, means for oscillating the lens and light-directing chamber and burying the outer lens-opening at the end of each oscillation, substantially as specified.

4. In a panoramic camera, a lens pivotally mounted on its optical center, a light-directing chamber, means for oscillating the lens and light-directing chamber to effect an exposure during opposite oscillatory movements, and means for securing or locking the lens at both ends of each oscillatory movement, substantially as specified.

5. In a panoramic camera, a lens pivotally mounted on its optical center, a light-directing chamber, means for oscillating said lens and chamber in opposite directions to effect an exposure on each and every oscillatory movement, and a locking device adapted to be moved into position to lock the lens and chamber at either end of the oscillatory movement, substantially as specified.

6. In a panoramic camera, a lens pivotally mounted on its optical center, a light-directing chamber, means for oscillating said lens and chamber, a locking device which may be moved into position to lock the lens and chamber at either end of the oscillatory movement, or may be placed in inert position, substantially as specified.

7. In a panoramic camera, a lens pivotally mounted on its optical center, a light-directing chamber, means for oscillating the same, a disk secured to the lens-shaft, recesses formed in said disk at different radial distances, and a vertically-movable pin riding on said disk and capable of movement to and away from the center of the disk, substantially as specified.

8. In a panoramic camera, a lens pivotally mounted on its optical center, a light-directing chamber, means for oscillating the same, a disk secured to the lens-shaft, recesses each having a beveled edge formed in said disk at different radial distances, and a vertically-movable pin riding on said disk and capable of movement to and away from the center of the disk, substantially as specified.

9. In a panoramic camera, a lens pivotally mounted on its optical center, a light-directing chamber, means for oscillating the same, a disk secured to the lens-shaft, recesses each of which has a beveled edge formed in said disk at different radial distances, and a vertically-movable pin having a beveled end riding on said disk and capable of movement to and away from the center of the disk, substantially as specified.

10. In a panoramic camera, a lens pivotally mounted on its optical center, a light-directing chamber, means for oscillating the same in opposite directions, said means consisting of a reciprocating part and means for converting the reciprocating movement of said part into an oscillatory movement of the lens and light-directing chamber, substantially as specified.

11. In a panoramic camera, a lens pivotally mounted on its optical center, a light-directing chamber, means for oscillating the same, in opposite directions, said means consisting of a reciprocating pneumatic plunger and means for converting the reciprocating movement of said plunger into an oscillatory movement of the lens and light-directing chamber, substantially as specified.

12. In a panoramic camera, a lens pivotally mounted on its optical center, a light-directing chamber, means for oscillating the same, said means consisting of a pneumatic plunger, a rack secured to said plunger, a gear-wheel meshing with said rack, a pawl carried on said gear-wheel, a heart-cam, a ratchet secured to said cam with which said pawl meshes, a rack carrying a friction-roller working in the groove of said cam, a gear-wheel on the lens-shaft whereby the rotation of the cam is converted into an oscillatory movement of the lens-shaft, substantially as specified.

13. In a panoramic camera, the combination of a cylinder vertically disposed in the front opening of the camera-box, a vertical shaft upon which said cylinder is mounted, a lens mounted in said cylinder and having its optical center in line with the axis of said cylinder, said cylinder being provided with an outer and inner lens-aperture, light-obstructing pieces behind which the outer lens-opening is moved at the end of each oscillation, and means for oscillating the cylinder and lens contained therein in opposite directions, substantially as specified.

14. In a panoramic camera, the combination of a cylinder vertically disposed in the front opening of the camera-box, a vertical shaft upon which said cylinder is mounted, a lens mounted in said cylinder and having its optical center in line with the axis of said cylinder, said cylinder being provided with an outer and inner lens-aperture, light-obstructing pieces consisting of the front part of the camera behind which the outer lens-opening is moved at the end of each oscillation, and means for oscillating the cylinder and lens contained therein in opposite directions, substantially as specified.

In witness whereof I have hereunto set my hand, in the presence of two subscribing witnesses, this 22d day of March, 1899.

ERNEST HOPKINSON.

In presence of—
SEABURY C. MASTICK,
IDA HOPKINSON.